Nov. 13, 1956 J. M. CLARK 2,770,721

SQUELCH CIRCUIT

Filed May 3, 1952 3 Sheets-Sheet 1

INVENTOR.
James M. Clark
BY
Foorman L. Mueller Atty.

Nov. 13, 1956 J. M. CLARK 2,770,721

SQUELCH CIRCUIT

Filed May 3, 1952. 3 Sheets-Sheet 2

INVENTOR.
James M. Clark

BY

Foorman L. Mueller Atty.

INVENTOR.
James M. Clark
BY
Foorman L. Mueller
Atty.

United States Patent Office 2,770,721

Patented Nov. 13, 1956

2,770,721

SQUELCH CIRCUIT

James M. Clark, Brookfield, Ill., assignor to Motorola, Inc., Chicago, Ill., a corporation of Illinois Application May 3, 1952, Serial No. 285,973

18 Claims. (Cl. 250—20)

The present invention relates generally to radio receivers, and more particularly to communication type radio receivers and to improvements in the squelch circuits of such receivers.

In the United States patents to Noble, 2,343,115 and 2,459,675, issued February 29, 1944, and January 18, 1949, respectively, very effective squelch systems are described, which have been highly satisfactory in use. A squelch system described in the aforementioned patents utilizes a squelch control tube which is responsive to a direct current control voltage resulting from the differential combination of two other direct current voltages, one of which is of one polarity having an amplitude varying in accordance with noise level, and the other of which is of the other polarity having an amplitude varying in accordance with the reception of a carrier wave by the receiver and the consequent reduction of the receiver noise level. The two direct current voltages are combined in such manner that the control voltage is either zero or of one polarity when noise is present in the absence of a carrier wave, and is of the other polarity when a carrier wave is received and the noise level is reduced. This basic squelch circuit has been effectively used with many types of radio receivers designed to receive either amplitude modulated or frequency modulated radio signals.

In a radio receiver designed to receive narrow band frequency modulated radio signals, some of the higher order sideband modulation energy in the signal to be received is of a frequency which is outside of the receiver pass band, thus reducing the moduation energy in the pass band. This increases the noise in the pass band and when using a squelch circuit of the above described type, the squelch tends to close, which is undesirable. In addition, all receivers of the narrow band type, due to bandwidth limitations, provide less noise energy above voice frequencies, which is available, for control of the squelch. To widen the band of noise frequencies by extending it down into the voice frequencies results in the tendency of the squelch to close on the upper voice frequencies which is, of course, undesirable.

Similarly, a radio receiver designed to receive amplitude modulated radio signals will provide an increase in noise level when the modulation of the received carrier signal is one hundred percent or higher and the carrier signal voltage goes to zero. Such increased noise would also tend to close the squelch when using the aforementioned squelch system and would interfere with the reception of a desired audio signal.

It is, therefore, an object of the present invention to provide an improved audio squelch system which may be used with various types of radio receivers including narrow band frequency modulation receivers and amplitude modulation receivers and which will maintain the squelch open at all times when a carrier modulated by an audio signal containing voice signals is received.

Another object of the invention is to improve the squelch system described in the foregoing paragraphs by making such system additionally responsive to the presence of a certain band of audio frequencies within the voice frequency range in the audio signal to be reproduced so that opening of the squelch when this band is received, is insured.

Yet another object of the present invention is to provide an improved squelch system which is responsive to receiver noise level in a wide band of high audio frequencies extending down into the upper range of voice frequencies and which is effective to close the squelch when the received noise level is above a predetermined value unless an audio signal containing the lower voice frequencies below one thousand cycles per second is received.

A feature of the invention is the provision in a communication radio receiver of a squelch control responsive to a squelch control direct current voltage which is the result of the differential combination of a direct current voltage of one polarity produced by rectification of a wide band of selected noise frequencies in the high audio range extending down into the upper voice frequency band preferably above one thousand cycles per second, together with a second direct current voltage of the opposite polarity produced by reception of a carrier signal by the receiver and also with a third direct current voltage of the opposite polarity produced from the detection of lower voice frequencies preferably lower than one thousand cycles per second in the audio signal to be reproduced.

Another feature of the invention for particular use with communication receivers designed to receive amplitude modulated radio signals, is the provision of a squelch control responsive to a squelch control direct current voltage which is the result of the differential combination of the three direct current voltages mentioned in the preceding feature of the invention, together with the differential combination of a fourth direct current voltage of opposite polarity to the polariy of the direct current voltage responsive to noise level. The fourth direct current voltage may be obtained from the receiver automatic volume control bias voltage whenever such voltage exceeds the amplitude of the second direct current voltage to thereby provide additional squelch control for tight squelch conditions such as when the audio modulation of the received carrier signal is in itself inherently noisy.

Yet another feature of the invention is the provision in a communication radio receiver of a squelch control responsive to a squelch control direct current voltage which is the result of the differential combination of at least two direct current voltages, one voltage having a polarity tending to close the squelch and produced in response to receiver noise level in the high audio frequency range above one thousand cycles per second, the other voltage having a polarity tending to open the squelch and produced in response to the presence of audio signals having a frequency below one thousand cycles per second in the audio signal to be reproduced.

Further objects, features and the attending advantages of the invention will be apparent with reference to the following specification and drawings in which.

In practicing the invention there is provided a radio receiver of the superheterodyne type, the audio reproduction of which is controlled by a squelch circuit. The squelch circuit includes means for providing a control voltage which varies from positive to negative values and which, when negative, permits audio reproduction, and when zero or positive, prevents audio reproduction. The squelch circuit is particularly applicable to narrow band FM receivers and amplitude modulation receivers. The circuit includes a first selective filter coupled to the audio portion of the receiver tuned to pass noise above the voice range and extending down into the upper portion of the voice range above one thousand cycles per second. The audio signals selected by this filter are amplified and rectified to provide a first direct current control voltage of positive polarity. A second direct current control voltage is obtained from the limiters of the receiver, being obtained by grid rectification in one of the limiter stages so that a negative voltage proportional to the strength of the receiver carrier wave is provided. If this voltage is taken from the 2nd limiter, a constant voltage independent of signal strength or noise level is available. A third control voltage is obtained by a second selective filter coupled to the audio portion of the receiver and tuned to pass audio frequencies in a narrow band below one thousand cycles per second where the voice energy is maximum. The signals selected by this filter are rectified to produce a third control voltage of negative polarity. The three control voltages are combined differentially to provide the squelch control voltage previously mentioned. The gain of the noise amplifier may be adjusted to produce the desired squelch threshold.

The squelch circuit in accordance with the invention applies both to frequency modulation receivers and amplitude modulation receivers but requires a receiver having one or more limiters operating on the carrier wave. In amplitude modulation receivers the limiters may be required solely for the purposes of the squelch circuit. These limiters are adjusted to provide saturation by the tube noise of the first radio frequency amplifier stage and thereby prevent external static or noise from opening the squelch. In amplitude modulation receivers the automatic volume control voltage may also be combined as a fourth control voltage with the first three control voltages so that the squelch is opened by a carrier signal notwithstanding the presence of noise in the audio signal.

Figures 1, 2:
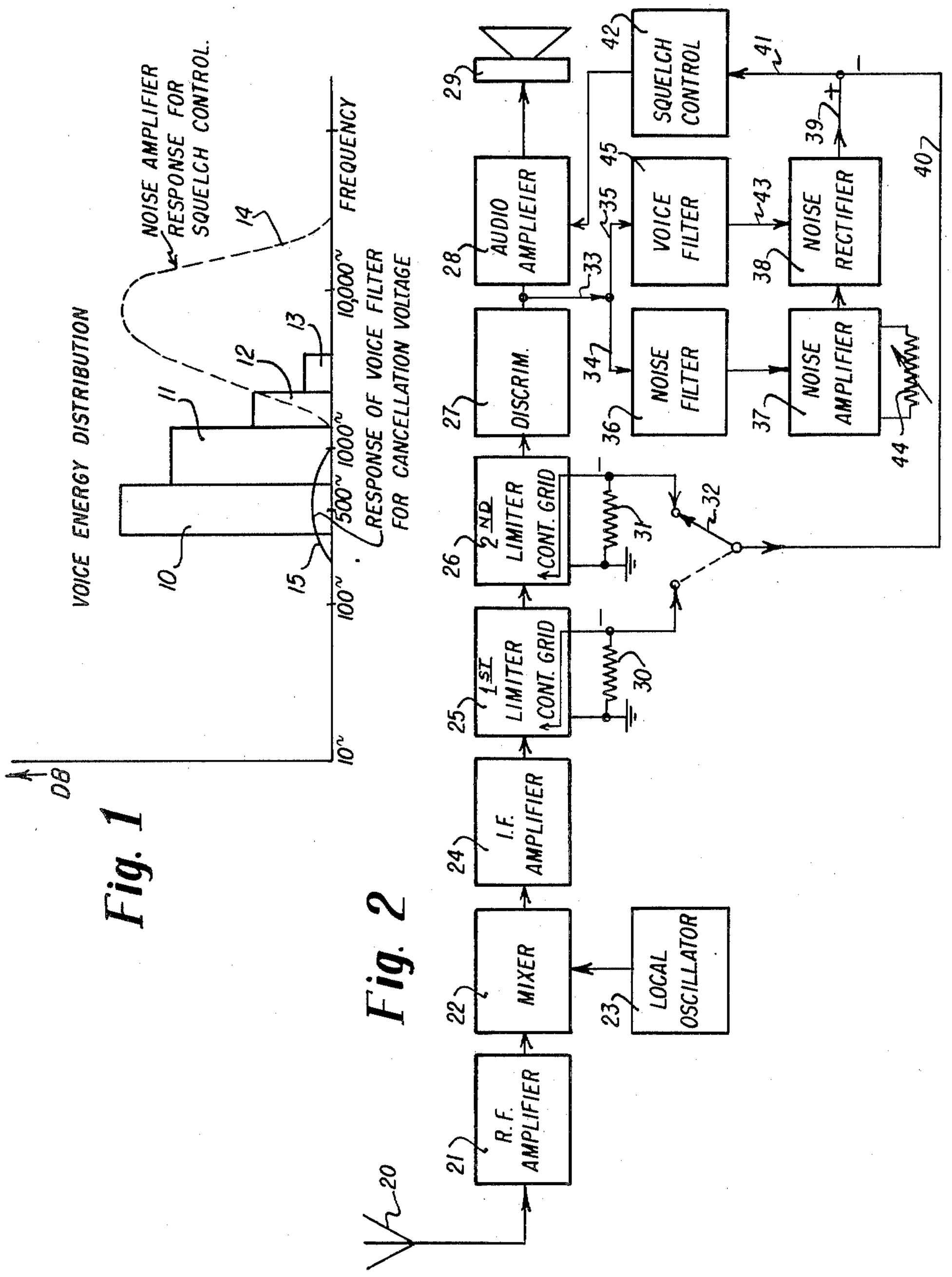
Fig. 1 is a family of curves to show the various frequency relationships in the squelch circuits of the invention.
Fig. 2 is a block diagram of a frequency modulation receiver embodying the squelch circuit of the invention.

Referring to the drawings for a more detailed description of the invention, Fig. 1 shows the average distribution of voice energy frequencies in an audio signal to be reproduced by a communication receiver. The curves of Fig. 1 are plotted for frequency versus signal amplitude in terms of decibel level, and it will be seen that the range of frequencies shown by the block curve 10 which centers about five hundred cycles per second is the range of voice frequencies with maximum energy. The range of frequencies 11 centering about one thousand cycles per second and the ranges of voice frequencies 12 and 13 extending beyond one thousand cycles per second are of considerably less amplitude. In other words, in the average voice communication, the maximum energy is distributed in the frequency range of about five hundred cycles per second. The frequency range for the frequency selective noise filter to be used in producing a squelch control voltage responsive to noise in the receiver is shown by the dotted line curve 14. The frequency response as shown by curve 14 extends from a central range of about ten thousand cycles per second down to and including the upper range of voice frequencies 12 and 13 above one thousand cycles per second. This wide range of noise filter response is particularly desirable when using the squelch system with a narrow band frequency modulation or amplitude modulation receiver in order to obtain sufficient noise energy to control the squelch, as previously mentioned.

Inasmuch as the band width of the noise amplifier response, as indicated by the dotted line curve of 14, includes the upper range of voice frequencies shown by curves 12 and 13, it is possible that the squelch will tend to close in response to such voice frequencies in the upper voice frequency range. In order to prevent such undesirable closing of the squelch, the squelch circuit of the invention provides a second voice frequency responsive filter circuit tuned to select a band of lower voice frequencies below one thousand cycles per second and centering about five hundred cycles per second as shown by curve 15, which is the point of maximum energy in the voice frequency range of the audio communication signal. The output of the second voice frequency responsive filter is rectified to produce a control voltage of opposite polarity to that produced by the noise voltage rectifier to counteract any such voltage produced by the upper range of voice frequencies and maintain the squelch open at all times during which the audio signal contains voice frequencies below one thousand cycles per second.

Fig. 2 of the drawings shows by a block diagram a narrow band frequency modulation receiver embodying the squelch circuit of the invention. The antenna 20 is connected to the radio frequency amplifying stage or stages 21, which in turn is connected to the mixer stage 22 for mixing with the local oscillator signal from the local oscillator 23 for producing an intermediate frequency signal to be amplified by the intermediate frequency amplifier 24. One or more intermediate frequency amplifier stages such as that shown at 24 may be used, and the final intermediate frequency amplifier stage is connected to one or more limiting amplifier stages such as shown at 25 and 26. The final limiting amplifier stage 26 is connected to a frequency discriminator stage 27 whose output is an audio signal to be reproduced by the audio amplifying stage 28 and loudspeaker 29. Each of the limiting amplifier stages 25 and 26 employ a grid controlled vacuum tube connected in a circuit such that the reception of a carrier signal for amplification by the limiting amplifier tube produces a voltage of negative polarity on the control grid of the tube due to grid rectification. Such voltage is shown diagrammatically to appear across the resistors 30 and 31 respectively and is to be used as one of the direct current voltages to be differentially combined for producing the squelch control voltage. The switch 32 provides a choice of negative voltage from the control grid of either the first limiting amplifier tube 25 or the second limiting amplifier tube 26.

The switch 32 need not necessarily be used in such a system, however, it is illustrative of an important feature. If control voltage is used from the first limiter the squelch will respond to extremely weak signals. If the receiver is to be used as an adjacent channel receiver or in noisy areas, the control voltage is taken from the second limiter stage. This voltage remains constant regardless of signal strength or noise level, but varies in proportion to variations in supply voltage. By proper selection of components this voltage is balanced against the positive rectified noise voltage which also varies with supply voltage so that the sum of the voltages is zero regardless of supply voltage.

The audio signal to be reproduced is also connected by line 33 and lines 34 and 35 to a pair of frequency selective filters 36 and 45 respectively. The frequency selective filter circuit 36 selects audio energy in the noise frequency range centering about ten thousand cycles per second. The lower limits of the signals passed extends into the upper voice frequency range above one thousand cycles per second, and may be about three thousand cycles per second. The signals passed by the filter 36 are amplified by the amplifying tube or stage 37 whose gain may be variably controlled by the control 44 to provide a squelch threshold control, as is conventional in the art. The output of the noise amplifier 37 is rectified by the rectifier 38 to produce a direct current signal of positive polarity in the line 39.

The voice frequency selective filter 45 is designed to have a very narrow pass band centering about 500 cycles per second and below one thousand cycles per second. The signal passed by the filter 45 is rectified to produce a signal of negative polarity by the rectifier 38, the signal of negative polarity tending to oppose the production of the signal of positive polarity from the noise amplifier 37. The resulting direct current signal in the line 39 is differentially combined with the signal in the line 40 of negative polarity as provided by the control grid of either the first or second limiting amplifier tubes 25 and 26. The resulting control signal in the line 41, which is obtained by the differential combination of the rectified negative polarity signals from the limiter stage 26 and the voice filter 45 together with the positive polarity signal from the noise amplifier 37, is applied to the squelch control circuit 42 connected to control the passage of audio signals to be reproduced through the audio amplifier 28 to the reproducer 29.

When noise appears in the audio signal output of the discriminator 27 in the absence of a carrier signal for producing a negative control voltage at the limiter control grid, the control signal in line 41 may be of zero voltage or may have a positive polarity to either of which the squelch control tube 42 responds in a manner to prevent the passage of audio signals through the audio amplifier 28. When a carrier signal is received, a negative voltage is produced at the control grid of the limiting amplifier tube 25 or 26 and the noise appearing in the audio output of the discriminator 27 is simultaneously reduced so that the polarity of the control signal in the line 41 becomes negative and the squelch control tube 42 responds to permit the passage of audio signals through the audio amplifier 28 to the reproducer 29. If the narrow band frequency modulated carrier signal deviates beyond the pass band of the receiver I. F. circuit 24, the noise level appearing in the audio signal output of the discriminator 27 will tend to increase which will tend to make the control voltage in the line 41 change from a negative polarity to a positive polarity and close the squelch. Similarly, due to the fact that the noise filter circuit 36 has a wide frequency range extending down into the upper voice frequency range, a modulation signal producing an audio signal in the output of the discriminator 27 within such upper voice frequency range would also produce a positive polarity signal in the lines 39 and 41 tending to close the squelch. Both of the aforementioned conditions are undesirable since closing of the squelch would prevent the reproduction of the desired audio signal. However, when either of the aforementioned two conditions exist, the energy passed by the voice filter 45 will produce a voltage in the line 43 which is effective in the rectifier circuit 38 to produce a negative voltage to counteract the positive polarity voltage in the lines 39 and 41 to thereby maintain the negative polarity of the control voltage in the line 41 and thus cause the squelch control 42 to maintain the audio amplifier 28 in a condition to receive and transmit the audio signal to the reproducer 29.

Figure 3:
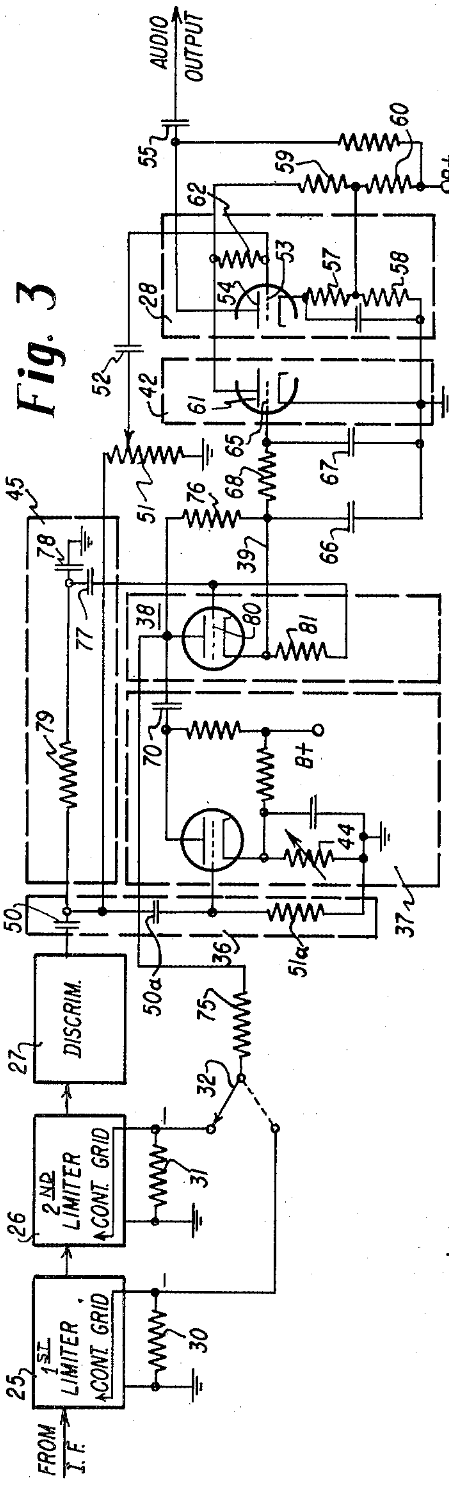
Fig. 3 is a combined schematic and block diagram showing details of the squelch circuit of Fig. 2.

One specific circuit for providing the squelch control arrangement diagrammatically shown in Fig. 2, is schematically shown in Fig. 3 of the drawings. It should be understood, however, that various detailed schematic arrangements may be used to provide the circuit functions diagrammatically shown in Fig. 2. The limiting amplifying stages 25 and 26 and the discriminator stage 27 are also shown in block outline in Fig. 3 since these circuits may be entirely conventional. The audio signal output from the discriminator 27 is connected by the coupling condenser 50 to the volume control 51 and by the coupling condenser 52 to the control grid 53 of a triode audio amplifier tube whose plate 54 is connected by the coupling condenser 55 to the audio output circuits for reproduction. The cathode 56 of the audio amplifier tube is connected through resistors 57 and 58 to ground in a circuit network also including the connection to the resistors 59 and 60. The resistor 60 is connected to the plate voltage supply of the receiver while the resistance 59 is connected to the plate 61 of the triode squelch control tube. The control grid 53 of the amplifier tube is also connected by the resistor 62 to the plate 61 of the squelch control tube and the arrangement is such that when the squelch control tube conducts and the plate voltage at the plate 61 is lowered, the control grid 53 of the audio amplifier will be biased more negative to prevent conduction of the audio signal through the audio amplifier tube to its plate electrode 54 and the output coupling condenser 55. On the other hand, when the voltage on the control grid 65 of the squelch control tube is of negative polarity relative to its cathode, the squelch control tube will be cut off and the voltage at its plate 61 will rise to make the bias potential on the control grid 53 of the amplifier tube more positive to permit the audio signal to be conducted through the amplifier tube to the output condenser 55. Thus, in such manner the application of a direct current control voltage to the control grid 65 of the squelch control tube is effective to prevent reproduction of the audio signal by the audio amplifier tube when its potential is zero or of positive polarity and is effective to permit amplification of the audio signal when its polarity is negative.

The control voltage on the control grid 65 of the squelch control tube is developed across the rectifier filter circuit including the condensers 66, 67 and filter resistance 68. The audio signal output from the discriminator 27 is connected by the coupling condensers **50*a*, and the grid resistor 51*a* to the control grid of the noise amplifier tube in the noise amplifier circuit 37. The values of the condenser 50*a* and the grid resistance 51*a* are chosen to provide a filter action equivalent to the noise filter 36 and preventing the passage of audio signals below about one thousand cycles per second to the control grid of the noise amplifier tube. The gain of the noise amplifier circuit 37 may be controlled by the variable resistance 44 in the amplifier tube cathode circuit. The output of the noise amplifier circuit 37 is connected by the coupling condenser 70 to the plate electrode of the noise rectifier tube in the rectifier circuit 38. The noise rectifier tube is of the grid controlled triode type. Assuming that the control grid of the rectifier tube 38 is biased in a manner to permit conduction therethrough, the noise energy amplified by the noise amplifier 37 will be rectified to produce a positive voltage from the rectifier tube cathode to line 39** for connection to the rectifier filter circuit.

The negative voltage developed on the control grid of either the first limiting amplifier or second limiting amplifier 25, 26, when a carrier signal is received is connected from the switch 32 through the resistances 75 and 76 to the rectifier filter circuit in opposition to the positive polarity direct current signal developed in line 39.

The third direct current voltage is provided by the voice filter circuit 45 including the resistor 79 and condensers 77 and 78 which are connected to the audio signal output of the discriminator 27 and the coupling condenser 50. The values of the resistance 79, condensers 77 and 78 are chosen such as to permit the application of signals having a frequency centering about five hundred cycles per second and below one thousand cycles per second to the control grid 80 of the grid controlled noise rectifier tube. The values of condensers 77 and 78 are small compared to the value of the filter condenser 66 and the signal applied to the control grid 80 is rectified by grid rectification to appear as a negative bias on the control grid and across the resistance 81 which reduces or prevents rectification of the noise energy applied to the plate electrode of the noise rectifier tube. Thus, in such manner the presence of audio signals in the voice frequency range below one thousand cycles per second will prevent the amplification of audio signals and noise above one thousand cycles per second by the noise rectifier 38 and thereby prevent the development of a positive polarity control signal in the line 39 for application to the control grid 65 of the squelch control tube. On the other hand, when no voice frequencies below one thousand cycles per second are present in the audio signal at the coupling condenser 50 and if sufficient noise energy above one thousand cycles per second is present, the noise amplifier 37 and the noise rectifier 38 will be effective to produce a signal of positive polarity in the line 39 for application to the control grid 65 of the squelch control tube in a manner to close the squelch and prevent reproduction of audio signals by the audio amplifier tube. When the switch 32 is in the solid line position as shown, the negative voltage on the second limiting amplifier tube 26 is applied in opposition to the positive polarity signal developed by the noise amplifier and rectifier 37 and 38 respectively to assure that the squelch will remain closed in the absence of a received carrier signal even though supply voltages may vary to cause variations in the receiver noise level. On the other hand, the switch 32 may be thrown to the dotted line position to provide an "easy open" reference voltage from the control grid of the first limiting amplifier tube 25 and make the squelch circuit more sensitive to variations in noise level.

In connection with the description of the invention, as particularly shown in Fig. 3 of the drawings, it would be mentioned that the lower voice frequency energy provided by the voice filter 37 may be rectified by a conventional diode rectifier in a manner to produce a negative polarity direct current voltage for application to the rectifier filter circuit including condensers 66 and 67 in opposition to the positive polarity voltage developed in line 39 in response to receiver noise. In such case the use of the grid controlled rectifier tube as specifically shown in Fig. 3 of the drawings would not be required.

Figure 4:
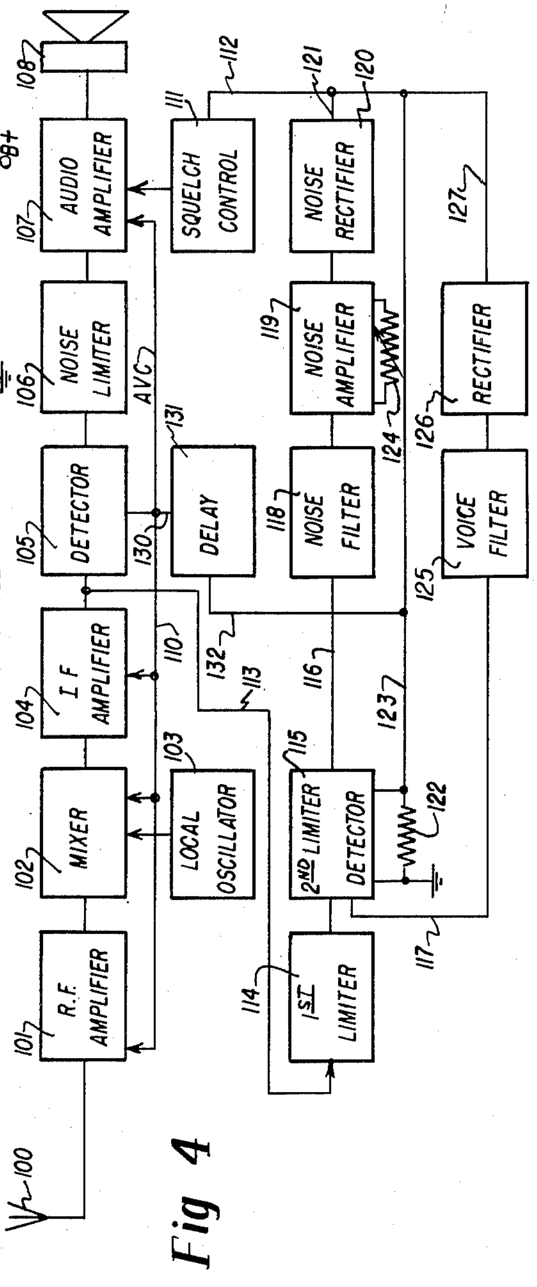
Fig. 4 is a block diagram of an amplitude modulation receiver embodying the squelch circuit of the invention.

Fig. 4 of the drawings is a block diagram of an amplitude modulation receiver of the superheterodyne type, embodying the squelch control system of the invention. The antenna 100 is connected through the radio frequency amplifying stage or stages 101 to the superheterodyne mixer stage 102 for mixing with the local oscillator signal from the local oscillator 103 to produce an intermediate frequency signal to be amplified by the intermediate frequency amplifier 104. The audio modulated signal from the last intermediate frequency amplifier, such as the amplifier 104 is connected to the audio demodulation detector 105 to produce an audio signal which may be connected through a conventional series noise limiter 106 to the audio amplifying stage 107 and loudspeaker 108. The detector 105 may include a conventional automatic volume control bias developing circuit for developing a negative polarity bias voltage in the line 110 for controlling the gain of the amplifier stages 101, 104 and the mixer stage 102, as is well known in the art. The AVC voltage is also used to control the gain of the audio amplifier stage 107. A squelch control tube or stage 111 is provided to control the operation of the audio reproducing stage 107 in a manner to prevent reproduction of audible noise in the absence of a received carrier signal modulated by a desired audio signal to be reproduced. The squelch control tube 111 is of the type similar to that described in connection with Fig. 3 of the drawings and will respond to the application a control voltage of one polarity in a manner to close the squelch and the application of a control voltage of the opposite polarity in a manner to open the squelch. The squelch control voltage in line 112 may be obtained by the differential combination of a plurality of direct current voltages of different polarities as obtained in response to different conditions of the receiver as will be described hereinafter.

The audio modulated signal output from the intermediate frequency amplifier stage 104 is connected by the line 113 to limiting amplifier stages 114 and 115 respectively. The second limiting amplifier stage 115 is connected in a circuit providing a detected output of demodulated audio signal only which is connected to lines 116 and 117. The limiting amplifiers 114 and 115 are used in the amplitude modulation receiver in order to prevent external noise from opening the squelch as will be presently understood. For such purpose, the limiting amplifier stage 115 is designed to provide limiter saturation by the noise developed in the tube of the first radio frequency amplifier stage 101 so that external noise will not open the squelch. Noise from the receiver is detected in the plate circuit of the second limiting amplifier tube 115 and is connected by line 116 to the noise filter 118 having a frequency range cutting off below one thousand cycles per second and centering about ten thousand cycles per second. The output of the noise filter 118 is amplified by the noise amplifier 119 whose gain may be adjusted by the variable gain control 124 to provide a control of squelch threshold. The amplified output from the noise amplifier 119 is rectified by the noise rectifier 120 to produce a signal of positive polarity in the line 121 for connection through line 112 to the squelch control tube 111 in a manner to close the squelch when receiver noise is present in the absence of a carrier signal. A received carrier signal will produce an increase in negative voltage at the control grid of the second limiting amplifier 115 as appearing across the grid resistor 122, which negative voltage is connected by the line 123 to be differentially combined with the rectified noise voltage signal in line 121. By adjusting the gain of the noise amplifier 119, the differentially combined voltages in lines 121 and 123 may be adjusted to produce a signal of negative polarity in line 112 to operate the squelch control 111 in a manner to open the squelch when a carrier signal is received.

Since the noise filter 118 has a frequency range extending into the upper voice frequencies, audio signals to be reproduced above one thousand cycles per second may tend to close the squelch by producing a signal of positive polarity in line 121 that is greater than the negative polarity signal in line 123 from the control grid of the limiting amplifier 115. This is, of course, undesirable and to prevent such closing of the squelch, a voice filter circuit 125 responsive to a range of frequencies below one thousand cycles per second and centering in the voice frequency range of about five hundred cycles per second is connected to the detected signal output of the second limiter 115 as appearing in line 117. The output signal from the voice filter 125 is connected to the rectifier 126 for producing a direct current signal of negative polarity in line 127 to be differentially combined with the signals in lines 123 and 121 to produce a squelch control voltage in line 112 which will be of negative polarity and will assure that the squelch will remain open during all times that an audio signal is to be reproduced, providing the audio signal contains frequencies below one thousand cycles per second.

In order to provide an additional control of the squelch to be opened whenever a carrier signal is received notwithstanding the presence of noise in the audio signal, the negative polarity automatic volume control bias voltage in line 110 may be connected by line 130 to a delay diode 131 for comparing with the amplitude of negative voltage on the control grid of the second limiting amplifier 115. Such negative voltage from the control grid of the limiting amplifier is connected by line 132 to the delay diode 131 in a manner such that when the amplitude of the negative polarity automatic volume control bias voltage in line 130 is greater, a fourth direct current voltage of negative polarity will be added to the voltage in line 132 to be combined with the signals in lines 121, 123 and 127, producing the differentially combined squelch control voltage in line 112. It should be understood, however, that the squelch control system of the present invention, as applied to an amplitude modulation radio receiver does not essentially require the use of the fourth control voltage as derived from the receiver automatic volume control bias voltage.

Figure 5:
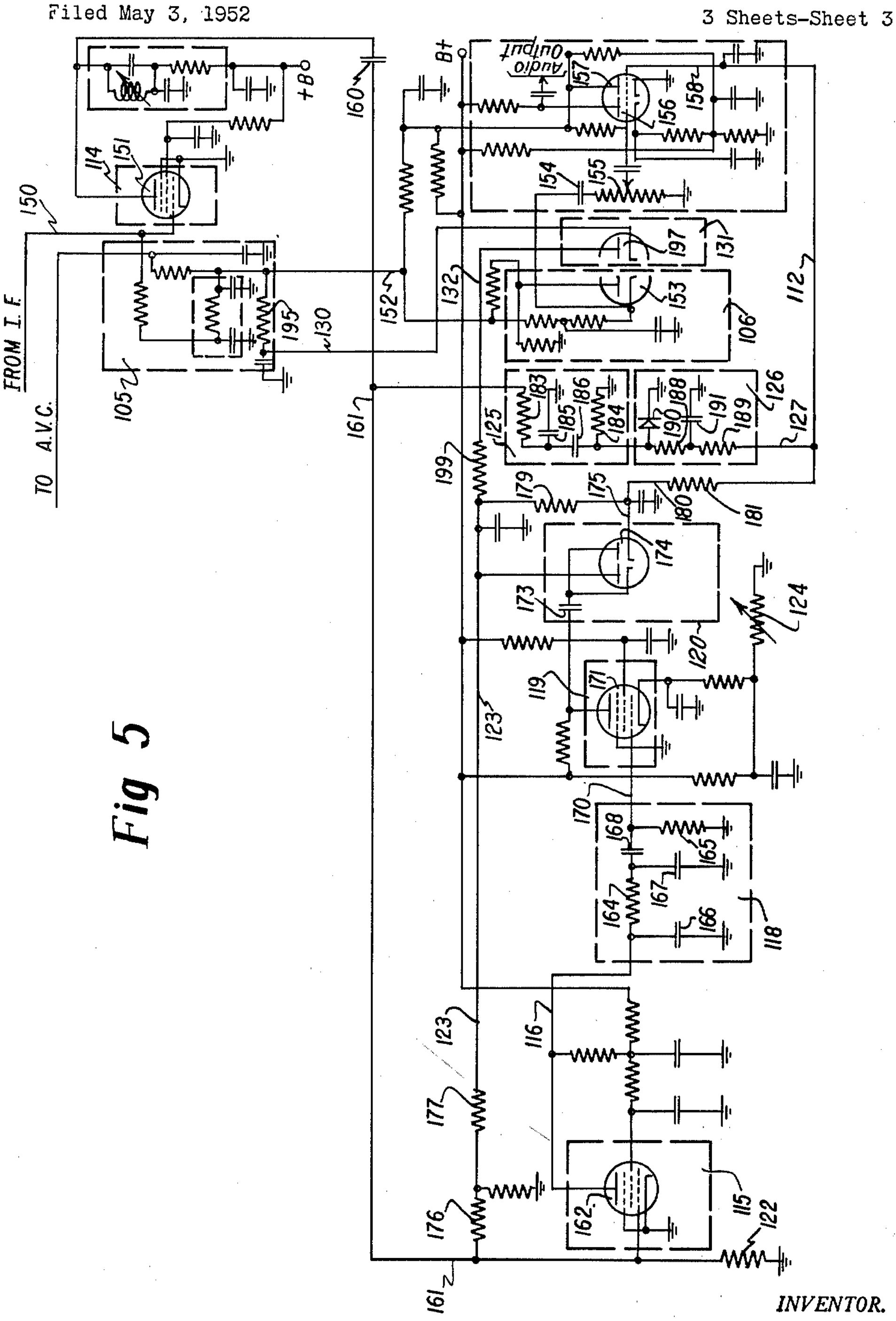
Fig. 5 is a schematic diagram of the squelch circuit of Fig. 4.

Referring to Fig. 5 of the drawings, a detailed schematic diagram is shown for embodying the features diagrammatically shown in connection with Fig. 4 of the drawings. The amplitude modulated signal from the intermediate frequency amplifier stage 104 is connected by line 150 to the control grid of the combined first limiting amplifier and audio signal demodulation detector tube 151. The audio signal is demodulated between the control grid and the cathode of tube 151 and such audio signal appears in line 152 for connection to the series noise limiter diode 153. The audio signal passed by the diode 153 is connected by coupling condenser 154 to the volume control 155 and to the control grid of the audio amplifying triode 156. The triode 156 is controlled by the squelch control triode 157 in a circuit which is substantially identical with that described in connection with Fig. 3 of the drawings and need not be further described. It may be mentioned, however, that the magnitude and polarity of the control voltage in line 158 for application to the control grid of the squelch control tube 157 controls the conductive condition of the audio amplifier triode 156 in a manner such that a negative polarity signal in the line 158 will open the squelch and a signal of zero potential or positive polarity in the line 158 is effective to close the squelch.

The audio modulated signal appearing at the plate of the first limiting amplifier tube 151 is connected by the coupling condenser 160 and line 161 to the control grid of the second limiting amplifier tube 162. The plate circuit of the second limiting amplifier tube 162 functions as a detector to demodulate the signal and provide an audio noise signal in line 116 which is connected through the noise filter 118 comprising resistors 164, 165 and condensers 166 through 168, arranged in a circuit to pass audio signals above one thousand cycles per second. The center frequency of the filter 118 is preferably designed at about ten thousand cycles per second. The signals passed by the noise filter 118 are connected by line 170 to the control grid of the noise amplifier tube 171 whose gain may be adjusted by the squelch threshold control 124 in its cathode circuit. The output of the noise amplifier tube is connected by the coupling condenser 173 to the noise rectifier tube 174 of the double diode type connected in a voltage doubling rectifying circuit. The rectified output of the noise rectifier 174 appears as a positive polarity direct current voltage in line 175 which voltage is obtained in response to noise in the audio signal in the frequency range above one thousand cycles per second. The negative voltage appearing by grid rectification across the resistor 122 connected to the control grid of the second limiting amplifier tube 162, when a carrier signal is received, is connected through resistors 176, 177, line 123 and resistance 179 to the noise rectifier 174 in a manner to oppose positive polarity direct current responsive to noise as developed in line 175. The differential voltage resulting therefrom is connected by line 180 and resistor 181 to line 112 for application to the control grid of the squelch control triode 157.

Since the noise filter circuit 118 also responds to the upper voice frequencies to produce a positive polarity control voltage tending to close the squelch, the voice filter 125 is provided. The voice filter 125, includes the resistors 183 and 184, together with condensers 185 and 186 connected in a circuit to pass signals of a frequency lower than one thousand cycles per second while excluding signals of a higher frequency. The signals passed by the filter 125 are rectified by the crystal rectifier 188 connected in a circuit with resistors 189 and 190 and condenser 191 effective to produce a negative polarity signal in line 127 in response to modulation peaks having a frequency below one thousand cycles per second. Such negative voltage developed in line 127 is differentially combined with the voltage in line 180 which is the differential combination of the positive polarity noise responsive voltage and the negative polarity carrier signal responsive voltage.

The audio demodulation detector 151 is connected in a circuit providing an automatic volume control bias voltage across the resistor 195. Such automatic volume control bias voltage is of negative polarity and is connected by line 130 to the cathode of the delay diode 197. The plate electrode of the delay diode 197 is connected by line 132 and resistance 199 to line 123 and the negative polarity voltage therein developed in response to grid rectification on the control grid of the second limiting amplifier 162. When the amplitude of the automatic volume control bias voltage of negative polarity in line 130 exceeds that of the limiter control grid voltage in line 123, such voltage in line 130 is conducted through the delay diode 197 for application to the noise rectifier output circuit to be differentially combined with the positive polarity voltage developed in response to receiver noise.

It is obvious from the above that an improved squelch system has been disclosed which is applicable to various different receiver constructions. The system has been disclosed in a narrow band frequency modulation receiver and an amplitude modulation receiver and is obviously of general application. The provision of a voltage responsive to the major concentration of the voice energy provides more reliable squelch operation under various conditions and results in improved over-all operation. The combination of this voltage with the control voltages resulting from noise rectification and from carrier rectification provides a very reliable system. The additional use of the automatic volume control voltage results in further improvement in amplitude modulation receivers.

Although certain embodiments of the invention have been described which are illustrative thereof, it is obvious that various changes and modifications can be made therein without departing from the intended scope of the invention as defined in the appended claims.

I claim:

1. In a radio receiver for receiving an audio modulated carrier wave and for deriving the audio signal therefrom, and having an audio signal reproducer, the voltage responsive means to control the operation of said reproducer to prevent the reproduction of noise in the absence of a desired audio signal containing voice frequencies including in combination, means responsive to noise in the derived audio signal in a selected range of frequencies above voice frequencies and also including the higher voice frequencies for producing a first direct current voltage of one polarity, means responsive to reception of a carrier wave by said receiver to produce a second direct current voltage having a polarity opposite to said first voltage, means responsive in a selected range of lower voice frequencies of the derived audio signal to produce a third direct current voltage of the same polarity as said second voltage, means to differentially combine said first, second and third voltages to provide a direct current control voltage, and means for controlling said audio reproducer in accordance with said direct current control voltage so that said reproducer is blocked when said control voltage is of said one polarity and is rendered operative when said control voltage is of said opposite polarity, whereby the reproduction of noise in the absence of a desired audio signal containing voice frequencies is prevented and the reproduction of an audio signal containing the selected range of lower voice frequencies is permitted.

2. In a radio receiver having an audio signal reproducer, the voltage responsive means to control the operation of said reproducer to prevent the reproduction of noise in the absence of a desired audio signal containing voice frequencies comprising in combination, means responsive to noise in a selected range of frequencies above one thousand cycles per second in the audio signal applied to said reproducer for producing a first direct current voltage of one polarity, means responsive to reception of a carrier signal by said receiver to produce a second direct current voltage having a polarity opposite to said first voltage, means responsive in a selected range of frequencies below one thousand cycles per second in the audio signal applied to said reproducer to produce a third direct current voltage of the same polarity as said second voltage, and means to differentially combine said first, second and third voltages to provide a direct current control voltage and for preventing operation of said reproducer when said direct current control voltage is of said one polarity, whereby the reproduction of noise in the absence of a desired audio signal containing voice frequencies is prevented and the reproduction of an audio signal containing voice frequencies below one thousand cycles per second is permitted.

3. In a radio receiver having an amplifier for audio modulated signals to be demodulated, a detector for demodulating the audio modulated signals to produce an audio signal, and an audio signal reproducer serially connected, the voltage responsive means to control the operation of said reproducer to prevent the reproduction of noise in the absence of a desired audio signal containing voice frequencies comprising in combination, means connected to the detector including a rectifier and a selective frequency filter responsive to noise in a selected range of frequencies including the upper voice frequencies and above for producing a first direct current voltage of one polarity, means connected to the detector including a rectifier and a selective frequency filter responsive in a selected range of lower voice frequencies for producing a second direct current voltage of a polarity opposite to said one polarity, means for deriving from the receiver a reference voltage which varies with the receiver supply voltage, means to differentially combine said first and second voltages and said reference voltage to provide a direct current control voltage for said reproducer which is of said one polarity in the absence of a desired audio signal and of said opposite polarity in the presence of a desired audio signal and squelch means connected to said reproducer and operating in response to said control voltage to control operation of said reproducer so that the reproduction of noise in the absence of a desired audio signal containing voice frequencies is prevented and the reproduction of an audio signal containing the lower voice frequencies is permitted.

4. In a radio receiver having an amplifier for audio modulated signals to be demodulated, a detector for demodulating the audio modulated signals to produce an audio signal, and an audio signal reproducer serially connected, the voltage responsive means to control the operation of said reproducer to prevent the reproduction of noise in the absence of a desired audio signal containing voice frequencies comprising in combination, means including a rectifier and a selective frequency filter responsive to noise in a selected range of frequencies including the upper voice frequencies and above connected to the signal to be demodulated for producing a first direct current voltage of positive polarity, means responsive to reception of a carrier signal by said receiver to produce a second direct current voltage of negative polarity, means including a rectifier and a selective frequency filter responsive in a selected range of lower voice frequencies connected to the signal to be demodulated to produce a third direct current voltage of negative polarity, and means to differentially combine said first, second and third voltages to provide a control voltage for said reproducer which is negative when a desired audio signal is received, said control voltage being connected to said reproducer in such manner that a voltage of negative polarity is effective to permit reproduction of the audio signal and a voltage of posiitve polarity prevents operation of said signal reproducer, whereby the reproduction of noise in the absence of a desired audio signal containing voice frequencies is prevented and the reproduction of an audio signal containing the lower voice frequencies is permitted.

5. In a radio receiver having an amplifier for audio modulated signals to be demodulated, a detector for demodulating the audio modulated signals to produce an audio signal, and an audio signal reproducer serially connected, the voltage responsive means to control the operation of said reproducer to prevent the reproduction of noise in the absence of a desired audio signal containing voice frequencies comprising in combination, means including a rectifier and a selective frequency filter connected to the detector responsive to a selected range of frequencies above a predetermined frequency in the audio frequency range for producing from the demodulated audio signal a first direct current voltage of one polarity, means responsive to reception of a carrier signal by said receiver to produce a second direct current voltage having a polarity opposite to said first voltage, means including a rectifier and a selective frequency filter connected to the detector responsive in a selected range of frequencies below said predetermined frequency for producing from the demodulated audio signal a third direct current voltage of the same polarity as said second voltage, means to differentially combine said first, second and third voltages to provide a control voltage for said reproducer which is of said one polarity in the absence of a desired audio signal and of said opposite polarity when a desired audio signal is received, and squelch means connected to said reproducer for preventing operation thereof in response to a control voltage of said one polarity, so that the reproduction of noise in the absence of a desired audio signal containing voice frequencies is prevented and the reproduction of an audio signal containing voice frequencies below one thousand cycles per second is permitted.

6. In a radio receiver having an amplifier for audio modulated signals to be demodulated, a detector for demodulating the audio modulated signals to produce an audio signal, and an audio signal reproducer serially connected, the voltage responsive means to control the operation of said reproducer to prevent the reproduction of noise in the absence of a desired audio signal containing voice frequencies comprising in combination, means including a rectifier and a selective frequency filter responsive to noise in a selected range of frequencies above one thousand cycles per second connected to the detector for producing from the demodulated audio signal a first direct current voltage of positive polarity, means responsive to reception of a carrier signal by said receiver to produce a second direct current voltage having a negative polarity, means including a rectifier and a selective frequency filter responsive in a selected range of frequencies below one thousand cycles per second connected to the detector for producing from the demodulated audio signal a third direct current voltage of negative polarity, means to differentially combine said first, second and third voltages to provide a control voltage for said reproducer, and squelch means connected to said reproducer for preventing operation thereof in response to a control voltage of positive polarity and for permitting operation thereof in response to a control voltage of negative polarity, whereby the reproduction of noise in the absence of a desired audio signal containing voice frequencies is prevented and the reproduction of an audio signal containing voice frequencies below one thousand cycles per second is permitted.

7. In a receiver for receiving frequency modulated radio signals and having an audio signal reproducer, said receiver including a grid controlled vacuum tube in a modulated signal limiter amplifying stage serially connected to a discriminator stage, the audio signal output of said discriminator stage being connected to said reproducer, the voltage responsive means to control the operation of said reproducer to prevent the reproduction of noise in the absence of a desired audio signal containing voice frequencies comprising in combination, means connected to the output of said discriminator and including a rectifier and a frequency selective filter responsive to noise in a selected range of frequencies above one thousand cycles per second for producing a first direct current voltage of positive polarity, means connected to the control grid of said tube in said limiter stage and responsive to reception of a carrier signal by said receiver to produce a second direct current voltage of negative polarity which varies with the receiver supply voltage, means connected to the output of said discriminator and including a rectifier and a frequency selective filter responsive in a selected range of frequencies below one thousand cycles per second to produce a third direct current voltage of negative polarity, and means to differentially combine said first, second and third direct current voltages to provide a control voltage for said reproducer, the control voltage being connected to said reproducer in such manner that a negative polarity control voltage is effective to permit audio signal reproduction whereby the reproduction of noise in the absence of a desired audio signal containing voice frequencies is prevented while the reproduction of an audio signal containing voice frequencies below one thousand cycles per second is permitted.

8. In a receiver for receiving frequency modulated radio signals and having an audio signal reproducer, said receiver including a grid controlled vacuum tube in a modulated signal limited amplifying stage serially connected to a discriminator stage, the audio signal output of said discriminator stage being connected to said reproducer, the voltage responsive means to control the operation of said reproducer to prevent the reproduction of noise in the absence of a desired audio signal containing voice frequencies comprising in combination, means connected to the output of said discriminator and including a grid controlled rectifier tube and a frequency selective filter responsive to noise in a selected range of frequencies above one thousand cycles per second for producing a first direct current voltage of positive polarity, means connected to the control grid of said tube in said limiter stage and responsive to reception of a carrier signal by said receiver to produce a second direct current voltage of negative polarity, means connected to the output of said discriminator and including a rectifier and a frequency selective filter responsive in a selected range of frequencies below one thousand cycles per second to produce a third direct current voltage of negative polarity, means to apply said third voltage to the control grid of said rectifier tube to prevent conductive rectification, and means to differentially combine said first and second direct current voltages to provide a control voltage for said reproducer, the control voltage being connected to said reproducer in such manner that a negative polarity control voltage is effective to permit audio signal reproduction whereby the reproduction of noise in the absence of a desired audio signal containing voice frequencies is prevented while the reproduction of an audio signal containing voice frequencies below one thousand cycles per second is permitted.

9. In a receiver for receiving frequency modulated radio signals and having an audio signal reproducer, said receiver including a grid controlled vacuum tube in a modulated signal limiting amplifier stage serially connected to a discriminator stage, the audio signal output of said discriminator stage being connected to said reproducer, the voltage responsive means to control the operation of said reproducer to prevent the reproduction of noise in the absence of a desired audio signal containing voice frequencies comprising in combination, means connected to the output of said discriminator and including a rectifier and a frequency selective filter responsive to noise in a selected range of frequencies including the upper voice frequencies and above for producing a first direct current voltage of one polarity, means connected to the control grid of said tube in said limiter stage and responsive to reception of a carrier signal by said receiver to produce a second direct current voltage of opposite polarity to said first voltage, means connected to the output of said discriminator and including a rectifier and a frequency selective filter responsive in a selected range of lower voice frequencies to produce a third direct current voltage the same polarity as said second voltage, and means to differentially combine said first, second and third direct current voltages to provide a control voltage for said reproducer, the control voltage being connected to said reproducer in such manner that the reproduction of noise in the absence of a desired audio signal containing voice frequencies is prevented while the reproduction of an audio signal containing the lower voice frequencies is permitted.

10. In a receiver for receiving amplitude modulated radio signals and having an audio signal reproducer, said receiver having a modulated signal amplifying stage connected to a signal demodulation detector stage, the audio signal output from said detector stage being connected to said reproducer, the voltage responsive means to control the operation of said reproducer to prevent the reproduction of noise in the absence of a desired audio signal containing voice frequencies comprising in combination, means connected to said modulated signal amplifying stage and including a limiting amplifier stage serially connected to a modulation detector and through a frequency selective filter to a modulation rectifier to be responsive to noise in a selected range of frequencies including an upper range of voice frequencies and above for producing a first direct current voltage of one polarity, means connected to said limiting amplifier stage and responsive to reception of a modulated carrier signal by said receiver to produce a second direct current voltage of opposite polarity to said first voltage, means connected to said limiting amplifier stage and including a detector and a frequency selective filter responsive in a selected range of lower voice frequencies to produce a third direct current voltage of the same polarity as said second voltage, and means to differentially combine said first, second and third direct current voltages to provide a control voltage for said reproducer, the control voltage being connected to said reproducer in such manner that the reproduction of noise in the absence of a desired audio signal containing voice frequencies is prevented and the reproduction of an audio signal containing the selected range of lower voice frequencies is permitted.

11. In a receiver for receiving amplitude modulated radio signals and having an audio signal reproducer, said receiver having a modulated signal amplifying stage connected to a signal demodulation detector stage, the audio signal output from said detector stage being connected to said reproducer, the voltage responsive means to control the operation of said reproducer to prevent the reproduction of noise in the absence of a desired audio signal containing voice frequencies comprising in combination, means connected to said modulated signal amplifying stage and including a limiting amplifier stage serially connected to a modulation detector and through a frequency selective filter to a modulation rectifier to be responsive to noise in a selected range of frequencies above one thousand cycles per second for producing a first direct current voltage of one polarity, means connected to said limiting amplifier stage and responsive to reception of a modulated carrier signal by said receiver to produce a second direct current voltage of opposite polarity to said first voltage, means connected to said limiting amplifier stage including a detector and a frequency selective filter responsive in a selected range of frequencies below one thousand cycles per second to produce a third direct current voltage of same polarity as said second voltage, and means to differentially combine said first, second and third direct current voltages to provide a control voltage for said reproducer, the control voltage being connected to said reproducer in such manner that the reproduction of noise in the absence of a desired audio signal containing voice frequencies is prevented and the reproduction of an audio signal containing the selected range of frequencies below one thousand cycles per second is permitted.

12. In a receiver for receiving amplitude modulated radio signals and having an audio signal reproducer, said receiver having a modulated signal amplifying stage connected to a signal demodulation detector stage, the audio signal output from said detector stage being connected to said reproducer, the voltage responsive means to control the operation of said reproducer to prevent the reproduction of noise in the absence of a desired audio signal containing voice frequencies comprising in combination, means connected to said modulated signal amplifying stage and including a limiting amplifier stage serially connected to a modulation detector and through a frequency selective filter to a modulation rectifier to be responsive to noise in a selected range of frequencies including an upper range of voice frequencies and above for producing a first direct current voltage of positive polarity, means connected to said limiting amplifier stage and responsive to reception of a modulated carrier signal by said receiver to produce a second direct current voltage of negative polarity, means connected to said limiting amplifier stage and including a detector and a frequency selective filter responsive in a selected range of lower voice frequencies to produce a third direct current voltage of negative polarity, and means to differentially combine said first, second and third direct current voltages to provide a control voltage for said reproducer, the control voltage being connected to said reproducer in such manner that a negative polarity control signal is effective to permit audio signal reproduction whereby the reproduction of noise in the absence of a desired audio signal containing voice frequencies is prevented and the reproduction of an audio signal containing the selected range of lower voice frequencies is permitted.

13. In a receiver for receiving amplitude modulated radio signals and having an audio signal reproducer, said receiver having a modulated signal amplifying stage connected to a signal demodulation detector stage, the audio signal output from said detector stage being connected to said reproducer, the voltage responsive means to control the operation of said reproducer to prevent the reproduction of noise in the absence of a desired audio signal containing voice frequencies comprising in combination, means connected to said modulated signal amplifying stage and including a limiting amplifier stage serially connected to a modulation detector and through a frequency selective filter to a modulation rectifier to be responsive to noise in a selected range of frequencies above one thousand cycles per second for producing a first direct current voltage of positive polarity, means connected to said limiting amplifier stage and responsive to reception of a modulated carrier signal by said receiver to produce a second direct current voltage of negative polarity, means connected to said limiting amplifier stage including a detector and a frequency selective filter responsive in a selected range of frequencies below one thousand cycles per second to produce a third direct current voltage of negative polarity, and means to differentially combine said first, second and third direct current voltages to provide a control voltage for said reproducer, the control voltage being connected to said reproducer in such manner that a negative polarity control signal is effective to permit audio signal reproduction whereby the reproduction of noise in the absence of a desired audio signal containing voice frequencies is prevented and the reproduction of an audio signal containing the selected range of frequencies below one thousand cycles per second is permitted.

14. In a receiver for receiving amplitude modulated radio signals and having an audio signal reproducer, said receiver having a modulated signal amplifying stage connected to a signal demodulation detector stage, said detector stage having means to provide a direct current automatic volume control voltage corresponding in amplitude to the amplitude of a received carrier signal, the audio signal output from said detector stage being connected to said reproducer, the voltage responsive means to control the operation of said reproducer to prevent the reproduction of noise in the absence of a desired audio signal containing voice frequencies comprising in combination, means connected to said modulated signal amplifying stage and including a limiting amplifier stage serially connected to a modulation detector and through a frequency selective filter to a modulation rectifier to be responsive to noise in a selected range of frequencies including an upper range of voice frequencies and above for producing a first direct current voltage of one polarity, means connected to said limiting amplifier stage and responsive to reception of a modulated carrier signal by said receiver to produce a second direct current voltage of opposite polarity to said first voltage, means connected to said limiting amplifier stage and including a detector and a frequency selective filter responsive in a selected range of lower voice frequencies to produce a third direct current voltage of the same polarity as said second voltage, means to compare the amplitude of said automatic volume control voltage with the amplitude of said second voltage to produce a fourth direct current voltage of the same polarity as said second voltage when the amplitude of said automatic volume control voltage is greater than the amplitude of said second voltage, and means to differentially combine said first, second, third and fourth direct current voltages to provide a control voltage for said reproducer, the control voltage being connected to said reproducer in such manner that the reproduction of noise in the absence of a desired audio signal containing voice frequencies is prevented and the reproduction of an audio signal containing the selected range of lower voice frequencies is permitted.

15. In a receiver for receiving amplitude modulated radio signals and having an audio signal reproducer, said receiver having a modulated signal amplifying stage connected to a signal demodulation detector stage, said detector stage having means to provide a direct current automatic volume control voltage corresponding in amplitude to the amplitude of a received carrier signal, the audio signal output from said detector stage being connected to said reproducer, the voltage responsive means to control the operation of said reproducer to prevent the reproduction of noise in the absence of a desired audio signal containing voice frequencies comprising in combination, means connected to said modulated signal amplifying stage and including a limiting amplifier stage serially connected to a modulation detector and through a frequency selective filter to a modulation rectifier to be responsive to noise in a selected range of frequencies above one thousand cycles per second for producing a first direct current voltage of one polarity, means connected to said limiting amplifier stage and responsive to reception of a modulated carrier signal by said receiver to produce a second direct current voltage of opposite polarity to said first voltage means connected to said limiting amplifier stage including a detector and a frequency selective filter responsive in a selected range of frequencies below one thousand cycles per second to produce a third direct current voltage of same polarity as said second voltage, means interconnecting said demodulation detector and said limiting amplifier to compare the amplitude of said automatic volume control voltage with the amplitude of said second voltage to produce a fourth direct current voltage of the same polarity as said second voltage when the amplitude of said automatic volume control voltage is greater than the amplitude of said second voltage, and means to differentially combine said first, second, third and fourth direct current voltages to provide a control voltage for said reproducer, the control voltage being connected to said reproducer in such manner that the reproduction of noise in the absence of a desired audio signal containing voice frequencies is prevented and the reproduction of an audio signal containing the selected range of frequencies below one thousand cycles per second is permitted.

16. In a receiver for receiving amplitude modulated radio signals and having an audio signal reproducer, said receiver having a modulated signal amplifying stage connected to a signal demodulation detector stage, said detector stage having means to provide a direct current automatic volume control voltage of negative polarity corresponding in amplitude to the amplitude of a received carrier signal, the audio signal output from said detector stage being connected to said reproducer, the voltage responsive means to control the operation of said reproducer to prevent the reproduction of noise in the absence of a desired audio signal containing voice frequencies comprising in combination, means connected to said modulated signal amplifying stage and including a limiting amplifier stage serially connected to a modulation detector and through a frequency selective filter to a modulation rectifier to be responsive to noise in a selected range of frequencies including an upper range of voice frequencies and above for producing a first direct current voltage of positive polarity, means connected to said limiting amplifier stage and responsive to reception of a modulated carrier signal by said receiver to produce a second direct current voltage of negative polarity, means connected to said limiting amplifier stage and including a detector and a frequency selective filter responsive in a selected range of lower voice frequencies to produce a third direct current voltage of negative polarity, means interconnecting said demodulation detector and said limiting amplifier to compare the amplitude of said automatic volume control voltage with the amplitude of said second voltage to produce a fourth direct current voltage of negative polarity, when the amplitude of said automatic volume control voltage is greater than the amplitude of said second voltage, and means to differentially combine said first, second and third direct current voltages to provide a control voltage for said reproducer, the control voltage being connected to said reproducer in such manner that a negative polarity control signal is effective to permit audio signal reproduction whereby the reproduction of noise in the absence of a desired audio signal containing voice frequencies is prevented and the reproduction of an audio signal containing the selected range of lower voice frequencies is permitted.

17. In a receiver for receiving amplitude modulated radio signals and having an audio signal reproducer, said receiver having a modulated signal amplifying stage connected to a signal demodulation detector stage, said detector stage having means to provide a direct current automatic volume control voltage of negative polarity, corresponding in amplitude to the amplitude of a received carrier signal, the audio signal output from said detector stage being connected to said reproducer, the voltage responsive means to control the operation of said reproducer to prevent the reproduction of noise in the absence of a desired audio signal containing voice frequencies comprising in combination, means connected to said modulated signal amplifying stage and including a limiting amplifier stage serially connected to a modulation detector and through a frequency selective filter to a modulation rectifier to be responsive to noise in a selected range of frequencies above one thousand cycles per second for producing a first direct current voltage of positive polarity, means connected to said limiting amplifier stage and responsive to reception of a modulated carrier signal by said receiver to produce a second direct current voltage of negative polarity, means connected to said limiting amplifier stage including a detector and a frequency selective filter responsive in a selected range of frequencies below one thousand cycles per second to produce a third direct current voltage of negative polarity, means interconnecting said demodulation detector and said limiting amplifier to compare the amplitude of said automatic volume control voltage with the amplitude of said second voltage to produce a fourth direct current voltage of negative polarity when the amplitude of said automatic volume control voltage is greater than the amplitude of said second voltage, and means to differentially combine said first, second, third and fourth direct current voltages to provide a control voltage for said reproducer, the control voltage being connected to said reproducer in such manner that a negative polarity control signal is effective to permit audio signal reproduction whereby the reproduction of noise in the absence of a desired audio signal containing voice frequencies is prevented and the reproduction of an audio signal containing the selected range of frequencies below one thousand cycles per second is permitted.

18. In a radio receiver having an audio signal reproducer, the voltage responsive means to control the operation of said reproducer to prevent the reproduction of noise in the absence of a desired audio signal containing voice frequencies comprising in combination, means responsive to noise in a selected range of frequencies above one thousand cycles per second in the audio signal applied to said reproducer for producing a first direct current voltage of positive polarity, means responsive in a selected range of frequencies below one thousand cycles per second in the audio signal applied to said reproducer to produce a second direct current voltage of negative polarity, means for providing a reference voltage of negative polarity which varies with the receiver supply voltage, means to differentially combine said first and second voltages and said reference voltage to provide a direct current control voltage, and squelch means connected to said reproducer for preventing operation thereof in response to a control voltage of positive polarity whereby the reproduction of noise in the absence of a desired audio signal containing voice frequencies is prevented and the reproduction of an audio signal containing voice frequencies below one thousand cycles per second is permitted.

References Cited in the file of this patent

UNITED STATES PATENTS

| | | |
|---|---|---|
| 1,968,460 | Llewellyn | July 31, 1934 |
| 2,098,286 | Garfield | Nov. 9, 1937 |
| 2,115,813 | Jarvis | May 3, 1938 |
| 2,521,752 | Schwarz | Sept. 12, 1950 |
| 2,543,523 | Couillard | Feb. 27, 1951 |
| 2,586,190 | Wasmansdorff | Feb. 19, 1952 |
| 2,589,711 | Lacy | Mar. 18, 1952 |
| 2,610,293 | Hanchett | Sept. 9, 1952 |
| 2,647,993 | Ziffer | Aug. 4, 1953 |